6766X

A. FOSTER & W. AVERY.

STEAM ENGINE.

Patented Sept. 28, 1831.

Ambrose Foster of Brutus, Cayuga county & William Avery of Salina in Onondagua county State of New York Letters Patent The Schedule referred to in these Letters Patent & making part of the same containing a description in the words of the said Ambrose Foster & William Avery themselves of their improvement in the Steam Engine, commonly called the Re-acting Engine -

To all whom it may concern, be it known, that we Ambrose Foster of Brutus, Cayuga county & William Avery of Salina in Onondaga county in the state of New York have invented a certain improvement in the Steam engine, commonly called the re-acting engine and that the following is a full & exact description of our said improvement -

Figure 2:
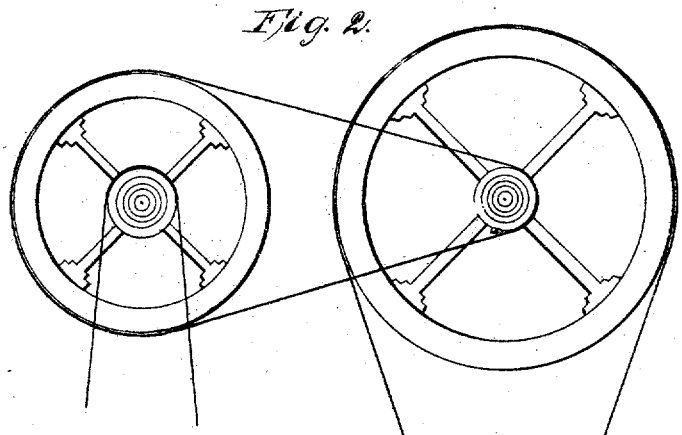
Figure 1:
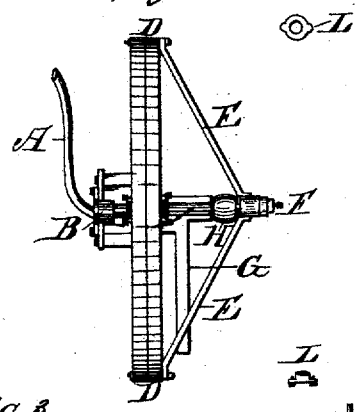
Figure 1:
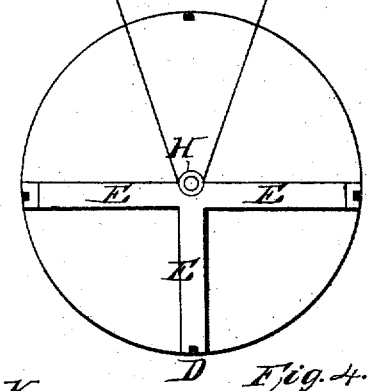
Figure 3:
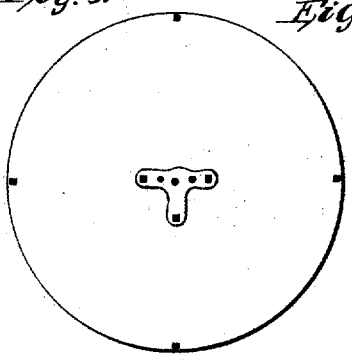

Fig: 1. In the accompanying drawing represents a side view of the engine, the revolving arms not being visible in consequence of their being enclosed in a circular case, to be presently described A is a steam tube, connected with a boiler & forming a steam tight joint in the box B where it opens into the shaft C which is made hollow, to the requisite depth D is the edge or periphery of a case or drum, within which the arms, from which the steam is to issue, revolve E E are braces, which may be attached to the case or drum, and at their junction support a socket containing a centre pin or screw F against which the shaft C is to run G is a tube through which the steam passing into the case from the revolving arms is allowed to escape, a portion of this steam is employed to heat the water by which the boiler is to be supplied H is a whirl upon the shaft C, a strap from which may be employed to drive machinery -

Where the same parts occur in the other figures in the drawing they are represented by the same letters. Fig. 2 shows the

Figure 5:
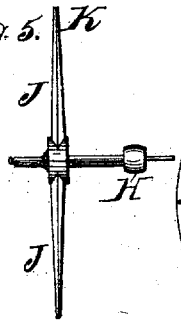
Figure 4:
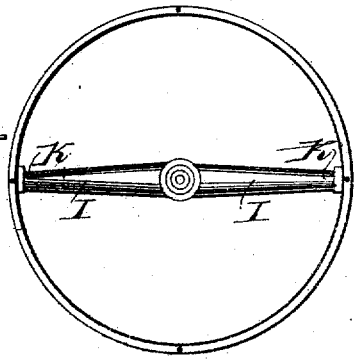

6766X the flat side of the drum or case, the arms or braces EE the whirl H &
the manner in which straps or other gearing may be carried from one
wheel to another – Fig: 3. is the opposite side of the drum or case I I in
fig: 4 shows the flat sides of the revolving hollow arms & J J Fig: 5. is
an edge view of the same. In Fig: 4 one side of the case is supposed
to be removed, and in Fig. 5 the whole case At K K openings are made
in the narrow edges of the arms, in directions opposite to each other
to allow of the escape of the steam introduced into them thro' the
shaft C with the hollow of which they communicate – In an engine
which we have in actual operation, the arms I I (or J J) are each
twenty inches in length – The width of the arms at the centre is
about 6 inches and at the ends about 2 1/2 inches; in depth or thickness
they are about 1 1/2 inch near the centre and about 3/4 inch near the end.
The size of the holes through which the steam escapes is about one
quarter by one eighth of an inch – The holes are so perforated that
the steam ~~boiler~~ shall ~~escape~~ issue at right angles with the shaft
We have found this engine to act with great power, but do not
intend to confine ourselves to these particular proportions, as we
mean not only to vary the size of our engines, but also the relative
proportions of their respective parts according to circumstances –
L L are parts of stuffing boxes employed to prevent the escape
of steam in a manner well known to machinists –

We find it to be a point of great importance to give such a
form to the revolving arms as shall subject them to the least pos-
sible resistance from the air, we therefore instead of making them
in the form of round tubes, which has been heretofore done, give
to them the form which results from making each half of the
arm a segment of a large circle so that when the two halves
are united, the edges of the tube present acute angles – The tubes
however may be made elliptical or oval and the same end will
be in great measure attained – We use any number of such arms
on the shaft, as we may find best adapted to our purpose –

We do not claim to be the inventors of the revolving steam

Engine; nor of the case or drum, within which we intend the arms
shall in general revolve; but what we claim as our invention, is
simply giving the oblate or flat form to the revolving arms, so that
in proportion to their capacity they shall experience much less
resistance from the air than that to which they have been heretofore
subjected, thereby obtaining a greatly increased power Witnesses to sign.ture of Amb. Foster
Thos. P. Jones — Ambrose Foster
Wm. Hewitt Witnesses to sign.ture of William Avery
S. B. Noble — Willm. Avery.
A. Northam 923 [illegible]

[illegible]